US012610311B2

(12) United States Patent　　　(10) Patent No.:　US 12,610,311 B2

Gizis et al.　　　(45) Date of Patent:　Apr. 21, 2026

(54) MONITORING MOBILE DEVICE DATA NETWORK USAGE TO IDENTIFY AUTHENTIC WI-FI SERVICE

(71) Applicant: Connectify, Inc., Philadelphia, PA (US)

(72) Inventors: Alexander Gizis, Philadelphia, PA (US); Brian Prodoehl, Plymouth Meeting, PA (US); Kevin Cunningham, Swarthmore, PA (US)

(73) Assignee: Connectify, Inc., Philadelphia, PA (US)

( * ) Notice: Subject to any disclaimer, the term of this patent is extended or adjusted under 35 U.S.C. 154(b) by 507 days.

(21) Appl. No.: 18/071,165

(22) Filed: Nov. 29, 2022

(65) Prior Publication Data

US 2023/0171683 A1　　Jun. 1, 2023

Related U.S. Application Data

(60) Provisional application No. 63/284,007, filed on Nov. 30, 2021.

(51) Int. Cl.
| | |
|---|---|
| *H04W 48/08* | (2009.01) |
| *H04L 12/46* | (2006.01) |
| *H04W 48/18* | (2009.01) |
| *H04W 88/06* | (2009.01) |

(52) U.S. Cl.
CPC ......... *H04W 48/18* (2013.01); *H04L 12/4641* (2013.01); *H04W 88/06* (2013.01)

(58) Field of Classification Search
CPC .... H04W 48/18; H04W 88/06; H04L 12/4641
See application file for complete search history.

(56) References Cited

U.S. PATENT DOCUMENTS

| | | | | |
|---|---|---|---|---|
| 10,091,168 | B2 * | 10/2018 | Hodroj | H04W 12/086 |
| 10,206,115 | B2 * | 2/2019 | Wu | H04W 76/40 |
| 2013/0219465 | A1 * | 8/2013 | Tse | H04W 12/08 |
| | | | | 726/3 |
| 2014/0003359 | A1 * | 1/2014 | Williams | H04W 12/03 |
| | | | | 370/329 |
| 2016/0308907 | A1 * | 10/2016 | Le | H04L 63/0281 |
| 2017/0366508 | A1 * | 12/2017 | Saraf | H04L 65/80 |
| 2018/0103505 | A1 * | 4/2018 | Amini | H04W 36/0094 |
| 2018/0352530 | A1 * | 12/2018 | Singh | H04W 76/23 |
| 2019/0200283 | A1 * | 6/2019 | Graybeal | H04W 48/18 |
| 2022/0368631 | A1 * | 11/2022 | Narula | H04L 45/02 |
| 2023/0012793 | A1 * | 1/2023 | Chak | G06F 3/0481 |
| 2023/0132095 | A1 * | 4/2023 | Mueller | H04W 84/12 |
| | | | | 370/329 |
| 2024/0073759 | A1 * | 2/2024 | Liu | H04W 36/00837 |

* cited by examiner

*Primary Examiner* — Blake J Rubin

(74) *Attorney, Agent, or Firm* — Kamran Emdadi

(57) ABSTRACT

One example process may include determining whether an Internet connection of a client device to a network is to a primary priority network or a lesser priority network based on a network type, identifying one or more network parameters associated with the network when the network type is a primary priority network, and determining whether to maintain the Internet connection and whether to change a network priority of the network based on the one or more network parameters.

14 Claims, 5 Drawing Sheets

100

200

Figure 3:
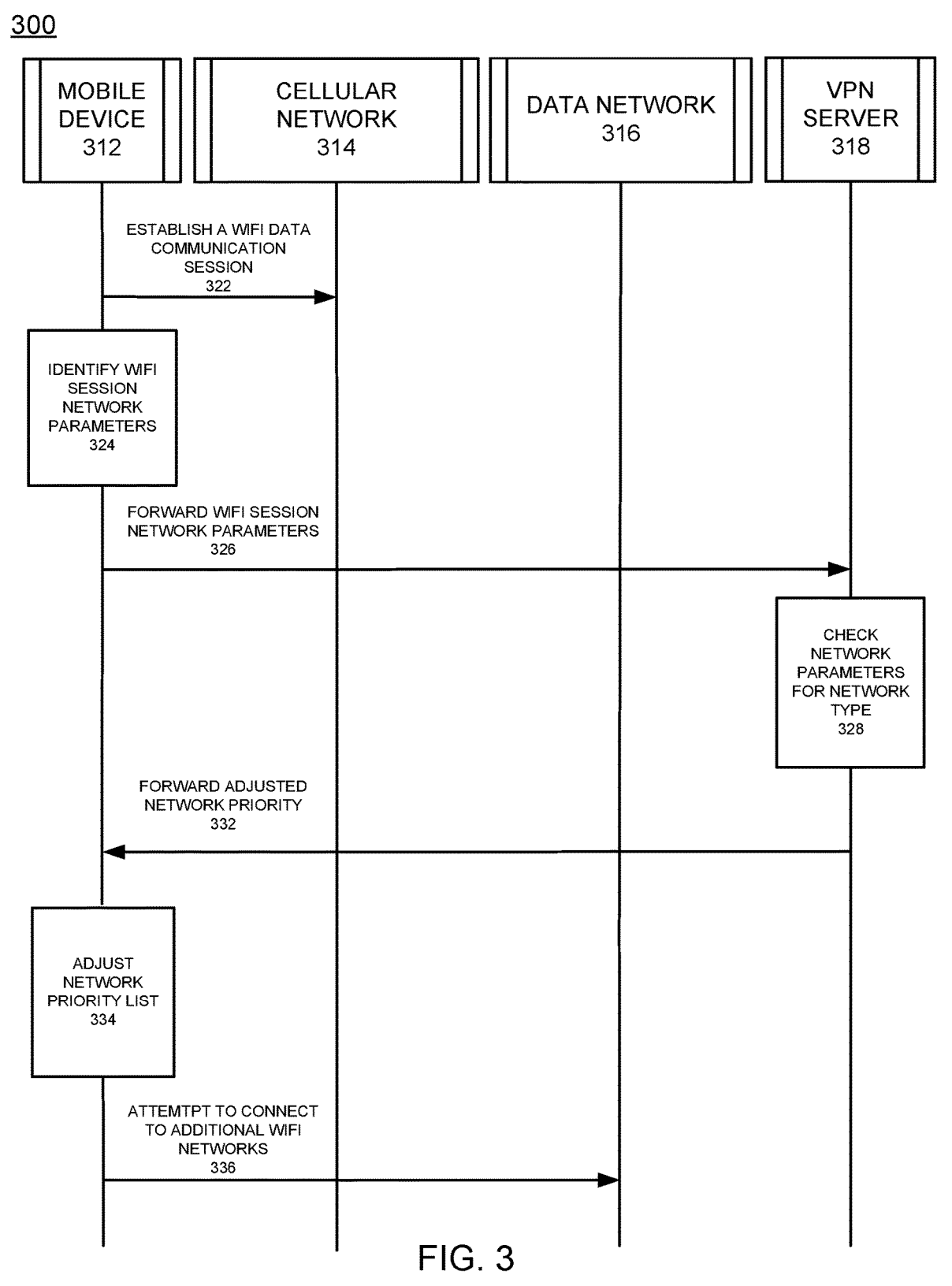

300

| MOBILE DEVICE 312 | CELLULAR NETWORK 314 | DATA NETWORK 316 | VPN SERVER 318 |

ESTABLISH A WIFI DATA
COMMUNICATION
SESSION
322

IDENTIFY WIFI
SESSION
NETWORK
PARAMETERS
324

FORWARD WIFI SESSION
NETWORK PARAMETERS
326

CHECK
NETWORK
PARAMETERS
FOR NETWORK
TYPE
328

FORWARD ADJUSTED
NETWORK PRIORITY
332

ADJUST
NETWORK
PRIORITY LIST
334

ATTEMTPT TO CONNECT
TO ADDITIONAL WIFI
NETWORKS
336

MONITORING MOBILE DEVICE DATA NETWORK USAGE TO IDENTIFY AUTHENTIC WI-FI SERVICE

TECHNICAL FIELD

This application relates to monitoring mobile device data usage over data networks (wireless local area networks) WLANs, and more specifically to identifying authentic Wi-Fi data service.

BACKGROUND

Conventionally, mobile/cellular networks offer data services to customers subscribing to certain large-scale parent organization carriers, such as VERIZON, T-MOBILE, ATT, etc. A mobile device will generally use Wi-Fi as well to send and receive data wherever possible. The Wi-Fi connections are generally available for free and/or provide large date rates without limitations imposed by cellular service providers.

When a virtual private network (VPN) service is used by a user (client) device, such as a mobile device or other computing device, the network being used for data services may be monitored and managed by the VPN to ensure the client device is using the network(s) designated by the VPN. The VPN may prioritize the Internet connection(s) based on how "expensive" and/or "optimal" those connections are when being used by the client device. This may be referred to as the "priority" of the connection(s) (e.g., "always/primary", "secondary", "backup", "never"). A client device may have multiple Wi-Fi networks to use at any given time and may also have more than one cellular network and in some cases even a satellite network that is available to transfer and receive data.

The application software of the VPN and/or the client device may attempt to use 'always/primary' connections all the time, 'secondary' only if it the client device would obtain a data rate boost, 'backup' only to keep the client device online, and 'never' generally not at all except for certain extenuating circumstances. The data network connection priority may be set in different ways, such as by examining the network adapter type to determine whether it is Wi-Fi, Ethernet, cellular, Bluetooth, etc. In this example, when the adapter is 'cellular' the network by default may be set to a 'secondary' network and if the network is anything else may be a 'primary' network. A user may override the settings in the VPN client application to manually change the priority on each adapter. An information technology (IT) management application may provide settings which are pushed from the VPN server to specific user accounts and devices to set adapter priorities correctly. Those approaches may be flawed since Wi-Fi and Ethernet adapters (especially for mobile device users, but not exclusively) can connect to various different networks.

Current system priorities may be provided with the assumption that Wi-Fi is the most optimal type of network, since most Wi-Fi locations are connected to homes, coffee shops, and offices that have unlimited data from their cable Internet, DSL and/or fiber Internet connections. But there are various Wi-Fi networks that are not what they are assumed to be and may be something different altogether on the back end. For example, if a client device joins a Wi-Fi hotspot created by another cellular device that is currently using a cellular network then it is actually a cellular connection that just appears to be a standard Wi-Fi connection. Satellite Internet stations may also include Wi-Fi hotspots that clients can join, however those Wi-Fi networks may also not be actual standard types of Wi-Fi. Those situations may be referred to as false positives since the Wi-Fi detected is correct but the underlying backbone connections used to create the Wi-Fi are not what is expected and should be avoided to reduce the amount of data being transferred over such networks.

SUMMARY

Example embodiments of the present application include a process which may include determining whether an Internet connection of a client device to a network is to a primary priority network or a lesser priority network based on a network type; identifying one or more network parameters associated with the network when the network type is a primary priority network; and determining whether to maintain the Internet connection and whether to change a network priority of the network based on the one or more network parameters.

Another example embodiment may include a processor configured to determine whether an Internet connection of a client device to a network is to a primary priority network or a lesser priority network based on a network type, identify one or more network parameters associated with the network when the network type is a primary priority network, and determine whether to maintain the Internet connection and whether to change a network priority of the network based on the one or more network parameters.

Another example embodiment may include a non-transitory computer readable storage medium configured to store instructions that when executed cause a processor to perform determining whether an Internet connection of a client device to a network is to a primary priority network or a lesser priority network based on a network type, identifying one or more network parameters associated with the network when the network type is a primary priority network, and determining whether to maintain the Internet connection and whether to change a network priority of the network based on the one or more network parameters.

BRIEF DESCRIPTION OF THE DRAWINGS

FIG. 3 illustrates a system signaling diagram of communication between a mobile device and various data network according to example embodiments.

DETAILED DESCRIPTION

Figure 1:
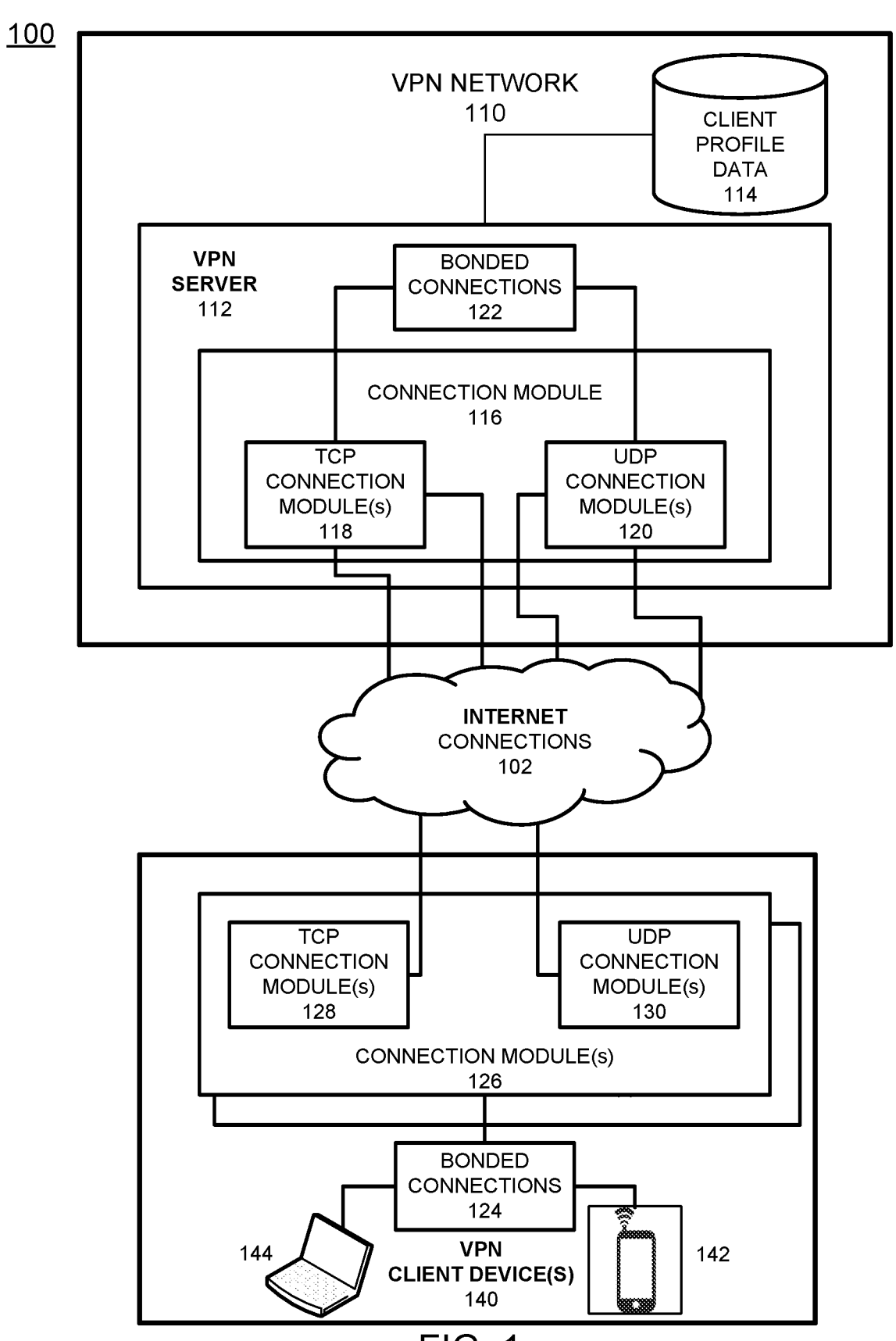
FIG. 1 illustrates an example data session network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments may be referred to with reference to a communication 'session'. The term session may be a communication data link between a client and server or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session, etc., among other device resources being used in a session. Multiple transport connections which are established via TCP and/or UDP may also be considered a session. Additionally, encryption that is used for the session may be independently established to include a unique key for each transport connection and/or channel established for the session. The session encryption may instead by a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

Network connection optimization for an application server may provide data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple network devices are connected. TCP/IP stands for transmission control protocol/

Internet protocol and it is specifically designed as a model to offer reliable data byte streams over various interconnected data networks/WLANs. UDP is a datagram/packet-oriented protocol used for broadcast and multicast types of network transmissions.

TCP is a connection-oriented protocol and UDP is a connectionless protocol. The speeds associated with TCP are generally slower than UDP, while the speeds of UDP are generally faster within the network with regard to sending data across a network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segments.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also does not perform the same error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1 illustrates an example data session network configuration according to example embodiments. Referring to FIG. 1, the configuration 100 may include a virtual private network (VPN) 110 which includes one or more VPN servers 112 and data storage, which in this case is used for storing client profile data 114 associated with one or more new or old client communication sessions. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session. The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transport connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

Figure 2A:
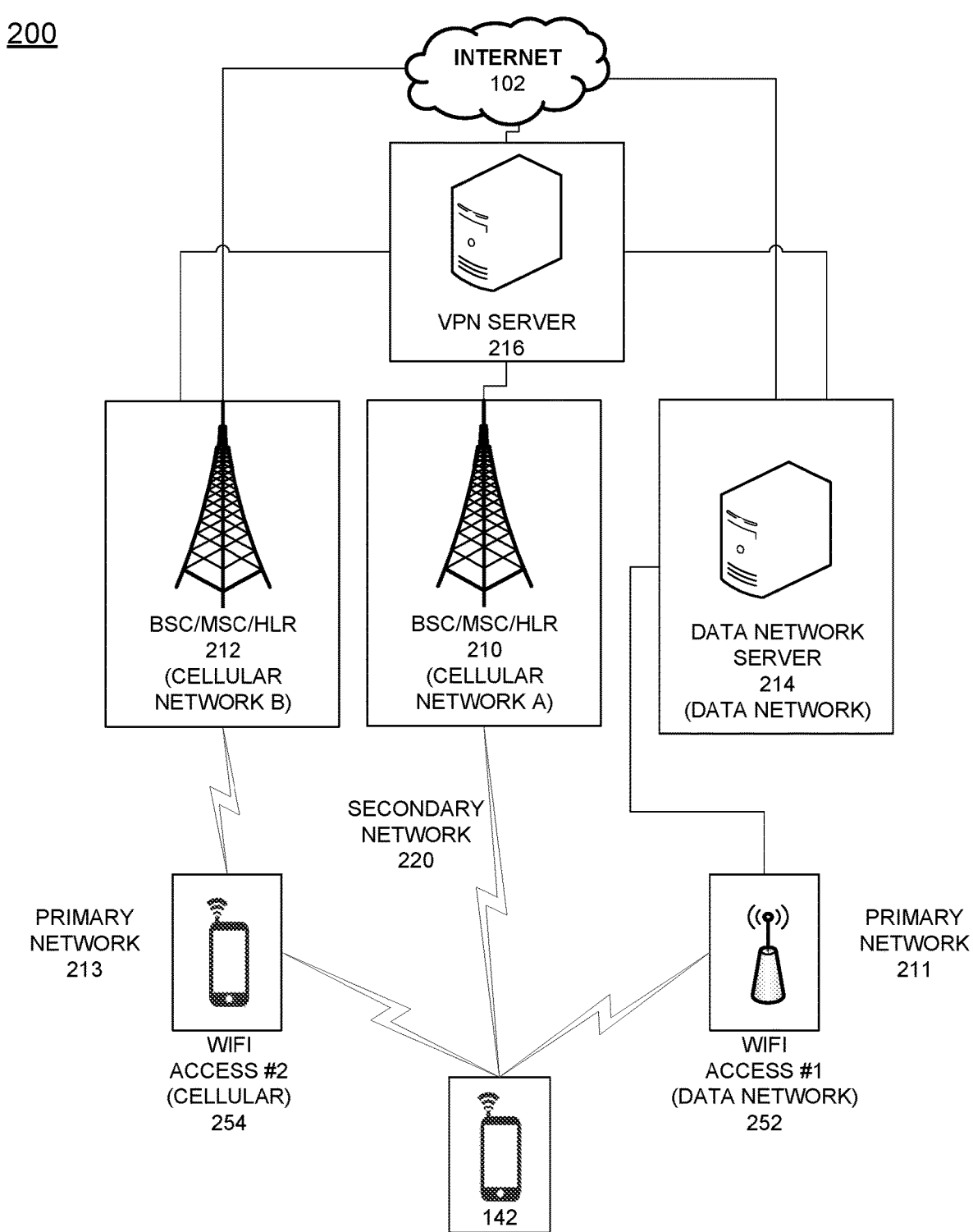
FIG. 2A illustrates an example network configuration of a mobile device being within a coverage area of a WLAN and one or more additional networks including a cellular network according to example embodiments.

FIG. 2A illustrates an example network configuration of a mobile device being within a coverage area of a WLAN and one or more additional networks including a cellular network according to example embodiments. Referring to FIG. 2A, the configuration 200 includes a cellular network 212 with one or more base stations, base controller stations (BSCs) mobile switching centers (MSCs) and home location resource (HLR) entities. The network 212 in this example may be an alternative cellular network (B) that is not the registered cellular network 210 (A) of mobile 'client' device 142. Another cellular network (A) 210 may be the registered home carrier network of mobile device 142. The cellular signals are likely to be widely available via a large coverage area provided to mobile device 142, however, the data rate, use time and/or total data used may be limited by an application operating on the mobile device 142. The management application (client VPN application) of the mobile device may be controlled by a VPN server 216 via a client service operating on the mobile device 142. The application may impose cellular data usage limits and restrictions and may attempt to have the mobile device 142 try to connect with available WLAN networks via a Wi-Fi connection signal. The application may also have a connection manager that identifies potential Wi-Fi networks (wireless local area networks WLANs) which can be used instead of cellular data after one or more data usage limits/thresholds are reached and/or at an earliest convenience to switch from a cellular data network to a Wi-Fi network.

The available wireless connections may provide one or more data sessions which are used to connect to the Internet 102 via a cellular session and/or any available WLAN (i.e., Wi-Fi sessions). In this example, the mobile device 142 may have first connected to a Wi-Fi connection 254. The application may initially identify all Wi-Fi connections as primary networks 211/213. In this example, there is more than one Wi-Fi network available 254 and 252 and one or more cellular connections, which may be, by default, a secondary network 220 since cellular data tends to have limits imposed by the carrier and service plans. Also, the mobile device 142 may have first connected to the Wi-Fi network 254 as a primary network 213 even though the backbone communication medium of that network is cellular. Such connection actions by the mobile device 142 will require a check-up process or revised identification process by the VPN server 216 and corresponding VPN client server to determine that cellular is part of the communication network and should be avoided especially when a data network 214 is the backbone network providing authentic Wi-Fi service (not based on a cellular data connection) via another available data access network 252. Once the cellular network is identified as being part of a Wi-Fi access network 254, the client service application of the client device 214 and/or VPN server 216 may demote the network 213 to a secondary or non-primary network so the subsequent network access attempts by the client device are not to the network 254 which is based on a cellular communication network.

Figure 2B:
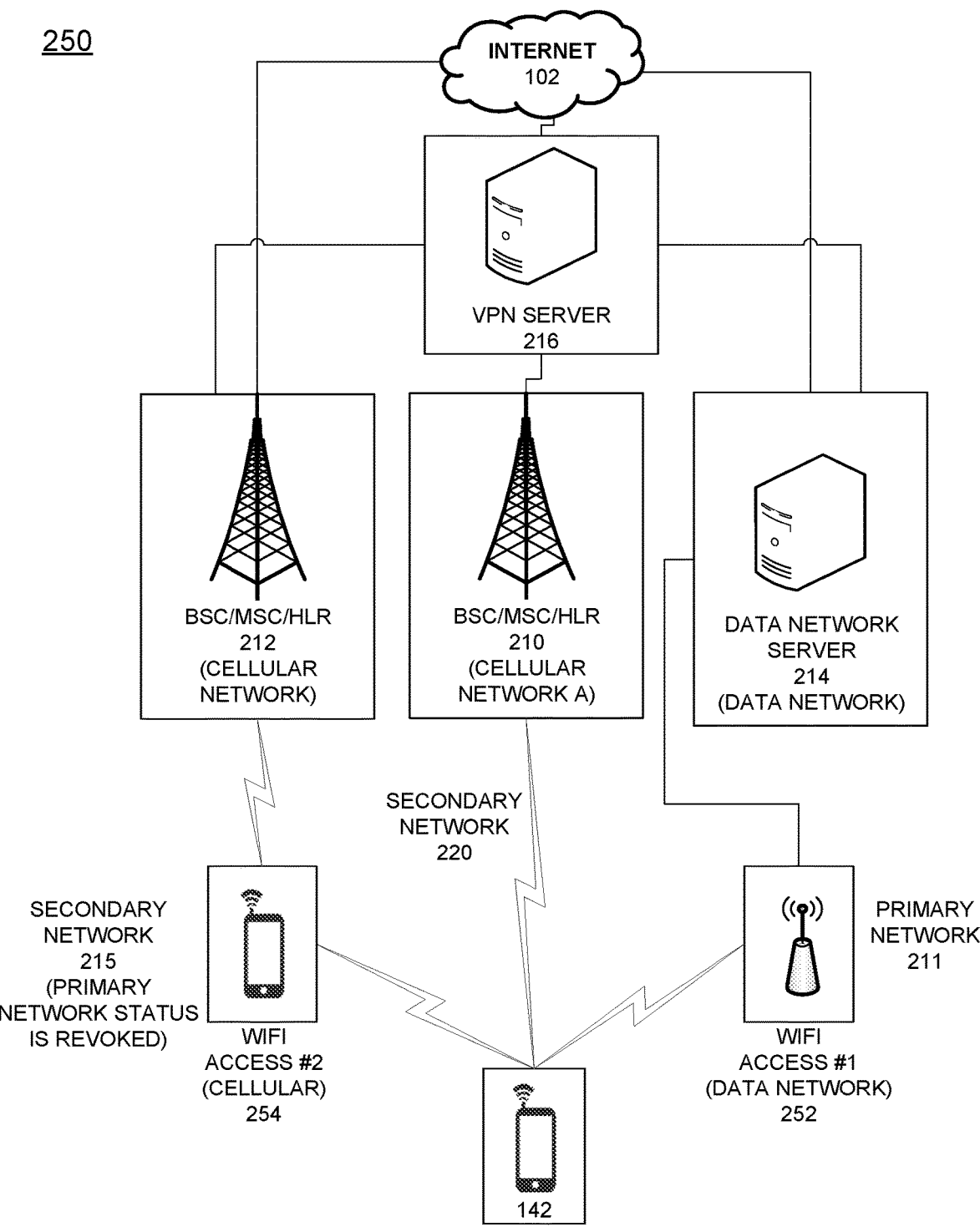
FIG. 2B illustrates an example network configuration of a mobile device being within a coverage area of a WLAN and one or more additional networks including a cellular network after identifying one or more WLANs are using cellular data according to example embodiments.

FIG. 2B illustrates an example network configuration 250 of a mobile device being within a coverage area of a WLAN and one or more additional networks including a cellular network after identifying one or more the identified WLANs are using cellular data according to example embodiments. Referring to FIG. 2B, when the Wi-Fi network is identified as having a cellular medium used to connect to the Internet 102, the network may be removed as a primary network form a list of networks maintained by the client device 142. The network 254 may be identified as cellular by an service set identifier (SSID) identification process and also via one or more network parameters beyond the network ID. In this example, the Wi-Fi network 254 is identified as a false positive result since cellular data is used, such as through a mobile device hotspot of another mobile device. The user and the client device may be unaware that this connection to network 254 is using cellular data on the backend of the connection. The VPN client application (installed on device 142) and/or the VPN server 216 may identify the cellular network 212 as part of the Wi-Fi access 254 and demote, remove, cancel, etc. the connection and label the network as non-primary/secondary 215 when using network 254. In the example of FIG. 2B, the Wi-Fi network 254 over cellular is demoted to a secondary network 215 similar to the mobile device's cellular network 210. The change in network status 215 will cause device 142 to ignore network 254 when other available networks are present, especially when they are deemed primary networks for offering Wi-Fi data services.

FIG. 3 illustrates a system signaling diagram of communication between a mobile device and various data networks according to example embodiments. Referring to FIG. 3, the process 300 may include a mobile/client device 312 attempting to connect 322 to the Internet via a Wi-Fi network that is operated over a cellular network 314, such as a hotspot or tethered device. The Wi-Fi session parameters 324 are identified by the mobile device and a client application, such as a VPN network application which may be used to apply selection criteria based on the identified session network parameters. The client device 312 may forward the network session data 326 to the VPN server 318 for further network analysis. The VPN server 318 may have a list of known IP addresses, network names, SSID names, etc., and other criteria to apply to the decision process as to determine whether the network is using cellular data or not using cellular data.

According to example embodiments, VPN server data network management of client devices may include automatically determining the sources of an Internet connection and inferring optimization of a particular source for a particular connection independent of a type of connection. This approach goes beyond relying on basic network connection information, such as adapter type, being used by a client device to access a network. One approach to furthering the optimization of a connection type and the investigation process may include identifying the Wi-Fi and/or hotspot service set identifier (SSID). If the SSID name includes something that is indicative of cellular, such as "cellphone", "mobile device", "Samsung", "Iphone" or something similar, then the network may be considered cellular or non-acceptable Wi-Fi. Another approach may include identifying names linked to the virtual network adapter being used by the mobile device 142 which may indicate cellular vs. Wi-Fi.

The VPN server may perform a lookup query operation to identify one or more IP addresses currently linked to each client device network adapter. The lookup may include querying a database of previously identified and labeled IP addresses. This example may include obtaining the IP address used by the network adapter and comparing it to a dynamic list of IP addresses linked to certain networks and service providers. One wireless service provider may use certain IP addresses for cellular service and may use other IP addresses for fiber optic data networks. Any IP addresses linked to the wireless side of a service provider may be considered cellular and may not be a 'primary' network to use by the client device. If the IP address lookup process yields a satellite ISP then it may be assumed that service is not a primary Internet service option since satellite is normally not an optimal data network for various reasons and is certainly not a common source of Wi-Fi data as a preferred network connectivity option.

A client device may temporarily adjust the rules on each wireless or wired network adapter of the client device. Rules can include: a priority, data rate limits, daily, weekly or monthly data maximum values, turning on or off compression to optimize bandwidth and data rate, etc. The VPN server 318 has a record of the client's real IP addresses and can perform a lookup of the network parameters 328 and return the results to the client device 332 for action to be taken. The client device would not just display the network information (though it can) it may instead adjust the rules and/or known networks 334 over which Internet connection packets should be sent and received. In this process, there is a client 312, a VPN server 318, a database (not shown), and multiple Internet connections. Once the mobile device 312 has made its network identification adjustments (upgrades, downgrades, etc.), it may attempt to connect 336 to another Wi-Fi network as another primary network type, and this time the network may be part of a data network 316 that is independent of cellular communications.

One example method of operation may include a method that includes determining whether an Internet connection of a client device to a network is to a primary priority network or a lesser priority network based on a network type, identifying one or more network parameters associated with the network when the network type is a primary priority network, and determining whether to maintain the Internet connection and whether to change a network priority of the network based on the one or more network parameters. The primary networks may be Wi-Fi networks which when identified, are the first networks to attempt a connection.

The process may also include forwarding, via the client device, the one or more network parameters to a virtual private network (VPN) server, receiving, via the client device, a confirmation message that the network type is a Wi-Fi network, and maintaining the Internet connection and the network priority as a primary priority network. The process may also include forwarding, via the client device, the one or more network parameters to a virtual private network (VPN), receiving, via the client device, a confirmation message that the network type is a Wi-Fi network being operated over a cellular network, discontinuing the currently used Internet connection, and modifying a network priority of the network. The client device determines the network type based on the one or more network parameters. The network priorities are stored in a list and include a primary priority network, a secondary network, a backup network and a non-use network, and the network types include Wi-Fi, cellular, and satellite. The process may also include determining a network adapter type used by the client device, determining the one or more network parameters comprise one or more of an IP address, a service set identifier (SSID) and a network name associated with a known network, comparing the one or more network parameters to a list of known network parameters, and confirming the network type is correct based on the comparing and should be used.

In one example, client device will identify available Wi-Fi networks in a particular location at a particular time. The plurality of networks may be assumed to be Wi-Fi as they are identified by the Wi-Fi application of the client device. As a first connection is established to a first network (network is joined by the client device) a public IP address is used to connect to the first network (i.e., Internet), the information may include an ISP which provides a connection (e.g., fiber, cable, satellite, etc.). The back end or physical connection that is providing the Wi-Fi can be used as the basis for the prioritization of the Wi-Fi network. The priority can be adjusted based on the type of network and/or the availability of another Wi-Fi network. Identifying a particular connection can provide a basis for prioritization, use, non-use, other objectives, etc.

Once a connection is made, the SSID is a foundational indicator that can offer some hint or label as to the source of the network and its back end connection. This process may also be applied to a connection to Ethernet, USB, BLU-ETOOTH (e.g., plug-in stick, dongle, etc.). Once the client device is connected, the public IP address can be identified as it pertains to the Internet. The IP address can be used to perform a database IP lookup to inform the ISP provider (COMCAST, VERIZON, STARLINK (SATELLITE)). Ideally, a Wi-Fi connection would be connected to a known Internet service provider via a common medium, and that information may be enough to designate that Wi-Fi network as a primary and/or priority network for the client device to use to access the Internet. A VPN server may assist the client device with data management services, etc. Other network connection options, such as BLUETOOTH based Wi-Fi can be slow and inconsistent, cellular backbone Internet connections are generally not preferred due to the lack of support and high cost of data services, which are often guarded by applications that prevent free use and open-ended Wi-Fi usage, especially by a third party that is not registered as a client device for that cellular connection. Those available connections should identified, labeled and avoided during a regular connection cycle for a mobile device. However, those connections can be used if necessary. One example may include combining primary network connections or channels with less preferred connections in a channel bonding or channel mirroring scenario. This approach enables a combination of available data usage to be used on both a preferred network channel and a non-preferred network channel. In one example, a channel being established on cellular may be a backup channel used when the Wi-Fi channel is experiencing latency, loss, jitter, etc. Also, data may be mirrored and sent on both channels between the client device and a VPN server to ensure all packets are received by the VPN server and forwarded to a destination.

The VPN server that monitors a client device's use of the Internet can prioritize the data connections for the client device via a VPN client application operating on the client device. The VPN server can also identify and/or impose data usage restrictions on the connections maintained by the client device. Two connections may be obtained by the client device, the objective may be for the VPN server to provide assistance with identifying the two most optimal or preferred types of data network connections so that channel bonding/connection combining of simultaneous connections may be achieved. Bonding and mirroring of the two connections/channels can be performed by the client device and monitored and maintained by the VPN server. Bonding should ideally occur on the two most preferred/highest priority connections. Additional connections/channels may be used as an alternative and/or as a third, or more channels, to include in a bonding session.

In one example of having more than two network connections available (See FIG. 2B), the client device 142 may be in a dynamic environment, such as moving around an area of a city or sitting on a train, in one example. The example may include using a Wi-Fi connection provided by the public transportation (train) while moving. The Wi-Fi network may be available as a primary network 211, such as the example of FIG. 2B. The mobile device may be transmitting and receiving data from a VPN server 216 which is managing data transfers ultimately intended for a 'content' or other data service server over the Internet 102. The client device 142 may also be using its cellular data connection 210 as a secondary network 220. The client device may have connected to another cellular network 212 via a friend's client device 254 which is offering a hotspot type of connection, which may appear as a Wi-Fi connection to the client device 142. In this example, the client device 142 may undergo a process of identifying the primary network 211 as a Wi-Fi primary network and the second Wi-Fi network (actually cellular) as a secondary network and then re-identifying the second Wi-Fi network 212 as a non-authentic Wi-Fi network once the network parameters are investigated/interrogated by the client device 142, a client VPN application and/or a VPN server 216 monitoring the network connection. This would cause the second Wi-Fi network 212 to be demoted to a third priority network when there are three networks and the client device mobile network to be considered the secondary network 220.

Continuing with the same example, the client device may be traveling on the train and the bonded channels between the secondary network 220 and the primary network 211 may become slowed by either one or both slowing down causing dropped packets, latency, jitter, etc. The secondary cellular network 215 may be considered either a third network or a backup secondary network such that the bonding process managed by the VPN server 216 may cause the client device to add the network 215 as a third network or as a temporary replacement for the secondary network 220 or the primary network 211. Options for managing the available channels may include bonding via a primary channel (P1—primary network 211) and a secondary channel (S1—secondary network 220) and/or another secondary channel (S2—secondary network 215). As a result, the bonding strategy may employ a bonding of S1 and P1, S1 and P1 and P2, S1 and P2, and P1 and P2. The client device 142 may utilize bonding of channels P1 and S1 indefinitely until a degradation in the data communications is experienced. Once degradation is detected in one or more of those channels, the next option may be to bond P1, S1 and S2. The S1 and S2 channels may alternate and share the responsibility of a bonded set of channels for predetermined periods of time, such as 30 seconds where S1 transfers data for 30 seconds while bonded with P1 which is also transferring data and then S2 transfers data for 30 seconds with P1 still transferring data. Once the secondary network S1 is identified as being proficient with recent data transfers, S2 will be set aside and removed from the bonding session until further notice. The likely scenario is that S1 is one carrier network and S2 is another carrier network which will inherently provide varying degrees of reliability at any particular place and time since both cellular channels are supported by different carriers. When all three channels are employed at the same time in a bonding scenario, S1 and S2 will likely share the responsibility of a secondary channel while P1 will still maintain a primary connection status.

In another scenario, continuing with the same example, the channel P1 will share data transferring over a period of time with S1. As either P1 or S1 begins experiencing data degradation, S2 will be introduced as a substitute for P1, S1 or both. The identification of S2 as a non-primary or non-secondary network will cause S2 to be used temporarily. Also, in another example, the amount of data transferred over P1 may be approximately twice what is sent over S1 or S2 or about the same as what is sent over S1 and S2 over a period of time. In another scenario, P1 may transfer about the same amount as S1 over a period of time, however, S2 may transfer a small amount of data that is approximately the difference between the amount of the amount of data transferred over P1 minus the amount of data transferred over S1. Over a period of time P1 may transfer the most data, S1 may transfer the second most data and S2 may transfer the third most data. S2 may also be used purely for redundancy, such as to re-send lost packets which were dropped from P1 and/or S1.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4:
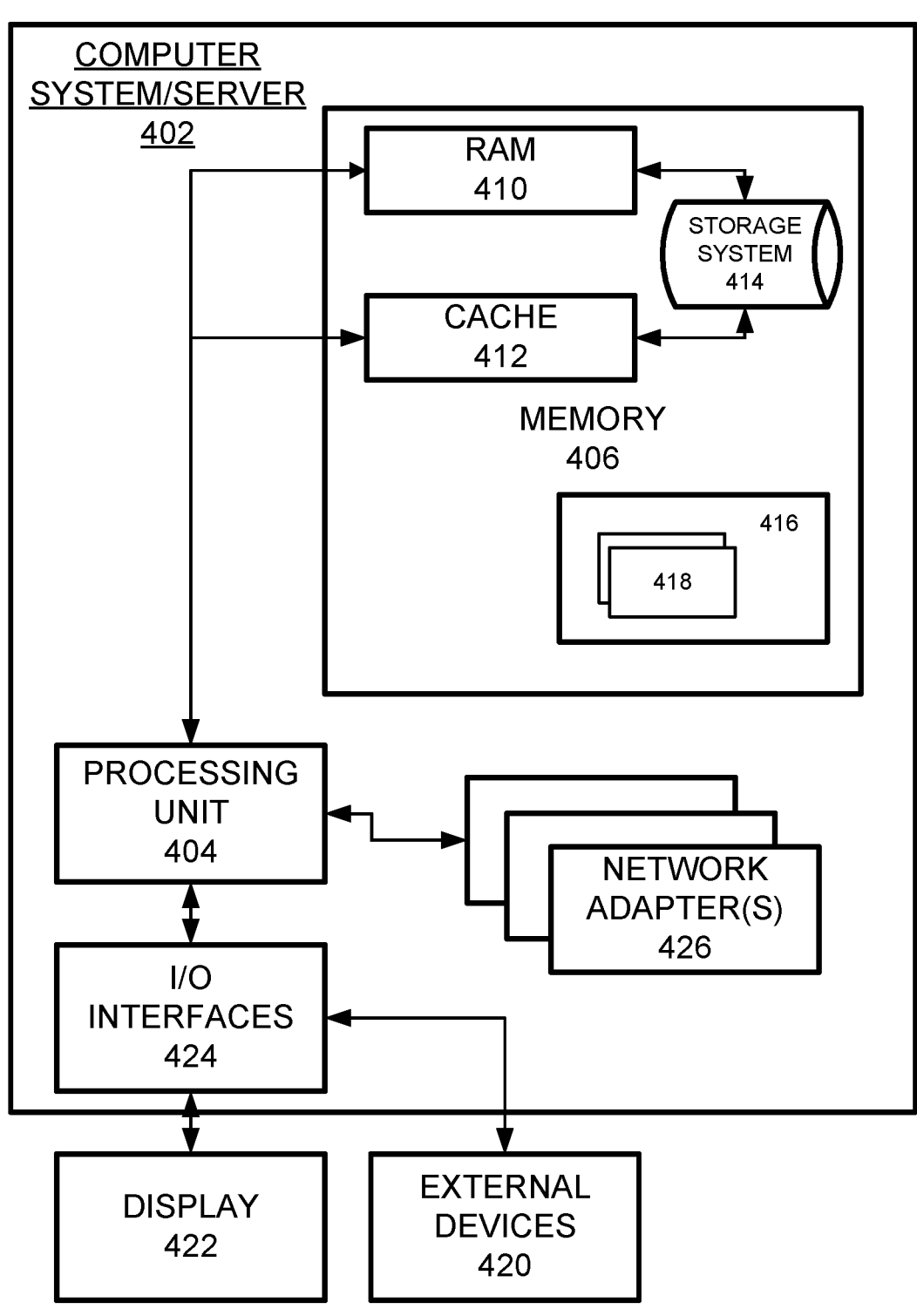
FIG. 4 illustrates an example network entity device configured to store instructions, software, and corresponding hardware for executing the same according to example embodiments.

FIG. 4 illustrates an example network entity device configured to store instructions, software, and corresponding hardware for executing the same according to example embodiments. FIG. 4 is not intended to suggest any limitation as to the scope of use or functionality of embodiments of the application described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 4, computer system/server 402 in cloud computing node 400 is displayed in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter(s) 426. As depicted, network adapter(s) 426 communicates with the other components of computer system/server 402 via a bus. It should be understood that although not displayed, other hardware and/or software components could be used in conjunction with computer system/server 402. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
determining whether an Internet connection of a client device to a network is to a primary priority network or a lesser priority network identified in a list maintained by the client device, wherein a priority level associated with the network is based on a network type and the primary priority level of the network is maintained in the list;
identifying one or more network parameters associated with the network when the network type is a primary priority network;
determining the primary priority network is a Wi-Fi network transferring data over a non-priority backbone network using a cellular network based on the one or more network parameters;

identifying the primary priority network as a Wi-Fi network utilizing a cellular backbone network after the one or more network parameters are identified as being used by the cellular backbone network; and
changing a network priority of the network by demoting the network from the primary priority network to a secondary network having a lesser priority and removing the network as the primary priority network from the list maintained by the client device.

2. The method of claim 1, comprising
forwarding, via the client device, the one or more network parameters to a virtual private network (VPN) server;
receiving, via the client device, a confirmation message that the network type is a Wi-Fi network being operated over a cellular network as the non-priority backbone network;
responsive to receiving the confirmation message, performing the demoting of the network.

3. The method of claim 1, wherein the network priorities stored in the list comprise the primary priority network, a secondary network, a backup network and a non-use network, and the network types include Wi-Fi, cellular, and satellite.

4. The method of claim 1, comprising
determining a network adapter type used by the client device; and
determining the one or more network parameters comprise one or more of an IP address, a service set identifier (SSID) and a network name associated with the network.

5. The method of claim 1, comprising
comparing the one or more network parameters to a list of known network parameters; and
confirming the network type is correct based on the comparing.

6. An apparatus comprising
a processor configured to
determine whether an Internet connection of a client device to a network is to a primary priority network or a lesser priority network identified in a list maintained by the client device, wherein a priority level associated with the network is based on a network type and the primary priority level of the network is maintained in the list;
identify one or more network parameters associated with the network when the network type is a primary priority network;
determine the primary priority network is a Wi-Fi network transferring data over a non-priority backbone network using cellular network based on the one or more network parameters;
identify the primary priority network as a Wi-Fi network utilizing a cellular backbone network after the one or more network parameters are identified as being used by the cellular backbone network; and
change a network priority of the network by demoting the network from the primary priority network to a secondary network having a lesser priority and remove the network as the primary priority network from the list maintained by the client device.

7. The apparatus of claim 6, wherein the processor is further configured to
identify the client device has forwarded the one or more network parameters to a virtual private network (VPN) server;

identify the client device has received a confirmation message that the network type is a Wi-Fi network being operated over a cellular network as the non-priority backbone network; and responsive to the confirmation message being received, perform the demotion of the network.

8. The apparatus of claim 6, wherein the network priorities stored in the list comprise the primary priority network, a secondary network, a backup network and a non-use network, and the network types include Wi-Fi, cellular, and satellite.

9. The apparatus of claim 6, wherein the processor is further configured to determine a network adapter type used by the client device; and determine the one or more network parameters comprise one or more of an IP address, a service set identifier (SSID) and a network name associated with the network.

10. The apparatus of claim 6, wherein the processor is further configured to compare the one or more network parameters to a list of known network parameters; and confirm the network type is correct based on the comparison.

11. A non-transitory computer readable storage medium configured to store instructions that when executed cause a processor to perform:

determining whether an Internet connection of a client device to a network is to a primary priority network or a lesser priority network identified in a list maintained by the client device, wherein a priority level associated with the network is based on a network type and the primary priority level of the network is maintained in the list;

identifying one or more network parameters associated with the network when the network type is a primary priority network;

determining the primary priority network is a Wi-Fi network transferring data over a non-priority backbone network using a cellular network based on the one or more network parameters;

identifying the primary priority network as a Wi-Fi network utilizing a cellular backbone network after the one or more network parameters are identified as being used by the cellular backbone network; and changing a network priority of the network by demoting the network from the primary priority network to a secondary network having a lesser priority and removing the network as the primary priority network from the list maintained by the client device.

12. The non-transitory computer readable storage medium of claim 11, wherein the processor is further configured to perform:

forwarding, via the client device, the one or more network parameters to a virtual private network (VPN) server;

receiving, via the client device, a confirmation message that the network type is a Wi-Fi network being operated over a cellular network as the non-priority backbone network; and responsive to receiving the confirmation message, performing one or more of discontinuing the Internet connection and modifying a network priority of the network.

13. The non-transitory computer readable storage medium of claim 11, wherein the network priorities stored in the list comprise the primary priority network, a secondary network, a backup network and a non-use network, and the network types include Wi-Fi, cellular, and satellite.

14. The non-transitory computer readable storage medium of claim 11, wherein the processor is further configured to perform:

determining a network adapter type used by the client device;

determining the one or more network parameters comprise one or more of an IP address, a service set identifier (SSID) and a network name associated with the network;

comparing the one or more network parameters to a list of known network parameters; and confirming the network type is correct based on the comparing.

* * * * *